(12) United States Patent
Hanes

(10) Patent No.: US 7,924,742 B2
(45) Date of Patent: Apr. 12, 2011

(54) NETWORK DEVICE DISCOVERY SYSTEM AND METHOD

(75) Inventor: David H. Hanes, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 11/527,857

(22) Filed: Sep. 27, 2006

(65) Prior Publication Data

US 2008/0123551 A1    May 29, 2008

(51) Int. Cl.
    *H04L 12/28* (2006.01)
(52) U.S. Cl. ......... 370/254; 370/390; 709/223; 709/224
(58) Field of Classification Search .................. 709/223, 709/224, 245, 242; 726/11–13; 370/390, 370/342, 475; 358/1.15
    See application file for complete search history.

(56) References Cited

U.S. PATENT DOCUMENTS

| | | | |
|---|---|---|---|
| 6,052,727 A * | 4/2000 | Kamalanathan | 709/224 |
| 6,249,814 B1 * | 6/2001 | Shaffer et al. | 709/223 |
| 6,496,859 B2 * | 12/2002 | Roy et al. | 709/223 |
| 6,516,000 B1 | 2/2003 | Kshirsagar et al. | |
| 6,859,834 B1 | 2/2005 | Arora et al. | |
| 7,069,338 B2 | 6/2006 | Popovich et al. | |
| 7,069,480 B1 | 6/2006 | Lovy et al. | |
| 7,072,337 B1 | 7/2006 | Arutyunov et al. | |
| 7,072,982 B2 | 7/2006 | Teodosiu et al. | |
| 7,089,293 B2 | 8/2006 | Grosner et al. | |
| 7,089,485 B2 | 8/2006 | Azadet et al. | |
| 7,187,461 B2 * | 3/2007 | Schlonski et al. | 358/1.15 |
| 7,383,574 B2 * | 6/2008 | Burrows et al. | 726/13 |
| 2002/0075870 A1 * | 6/2002 | de Azevedo et al. | 370/390 |
| 2003/0233475 A1 | 12/2003 | Maufer et al. | |
| 2008/0162723 A1 * | 7/2008 | Zhao et al. | 709/242 |

* cited by examiner

*Primary Examiner* — Robert W Wilson
*Assistant Examiner* — Mohamed Kamara

(57) ABSTRACT

A network device discovery system includes a computing system configured to broadcast a device discovery datagram packet to a network such that the device discovery datagram packet is encoded with data identifying at least one device discovered on the network, wherein if a time period from the broadcast of the device discovery datagram packet exceeds a predetermined threshold and a quantity of device discovery datagram packets broadcast to the network exceeds a predetermined threshold, the computing system is configured to discontinue broadcast of device discovery datagram packets to the network.

13 Claims, 3 Drawing Sheets

NETWORK DEVICE DISCOVERY SYSTEM AND METHOD

BACKGROUND

Computing systems connected to a network generally perform a discovery or enumeration procedure to detect and/or otherwise identify other devices on the network. One method for performing the device discovery procedure is to generate and broadcast datagram packets onto the network and evaluate the datagram response packets received from the various devices on the network. However, this type of datagram enumeration procedure is sometimes unreliable. For example, if the discovery datagram packet cannot be sent over the network or the discovery datagram packet is not received by one or more network devices, no error is generated to alert the sender that the discovery datagram packet was not received be a network device. Further, if too many responses are received at one time by the computing system, one or more of the responses may be "dropped" (e.g., not processed and/or discarded).

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
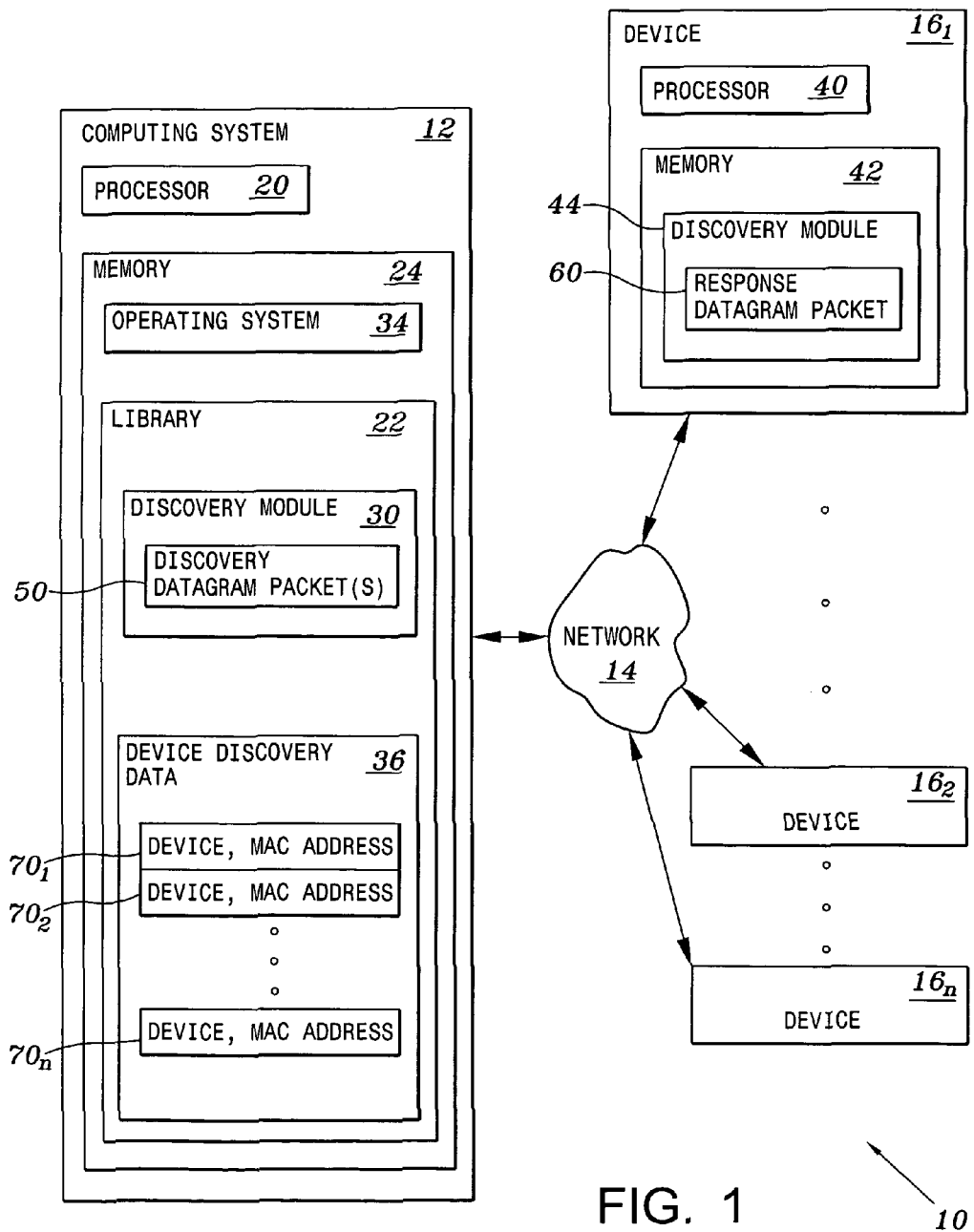
FIG. 1 is a diagram illustrating an embodiment of a network device discovery system.
Figure 2:
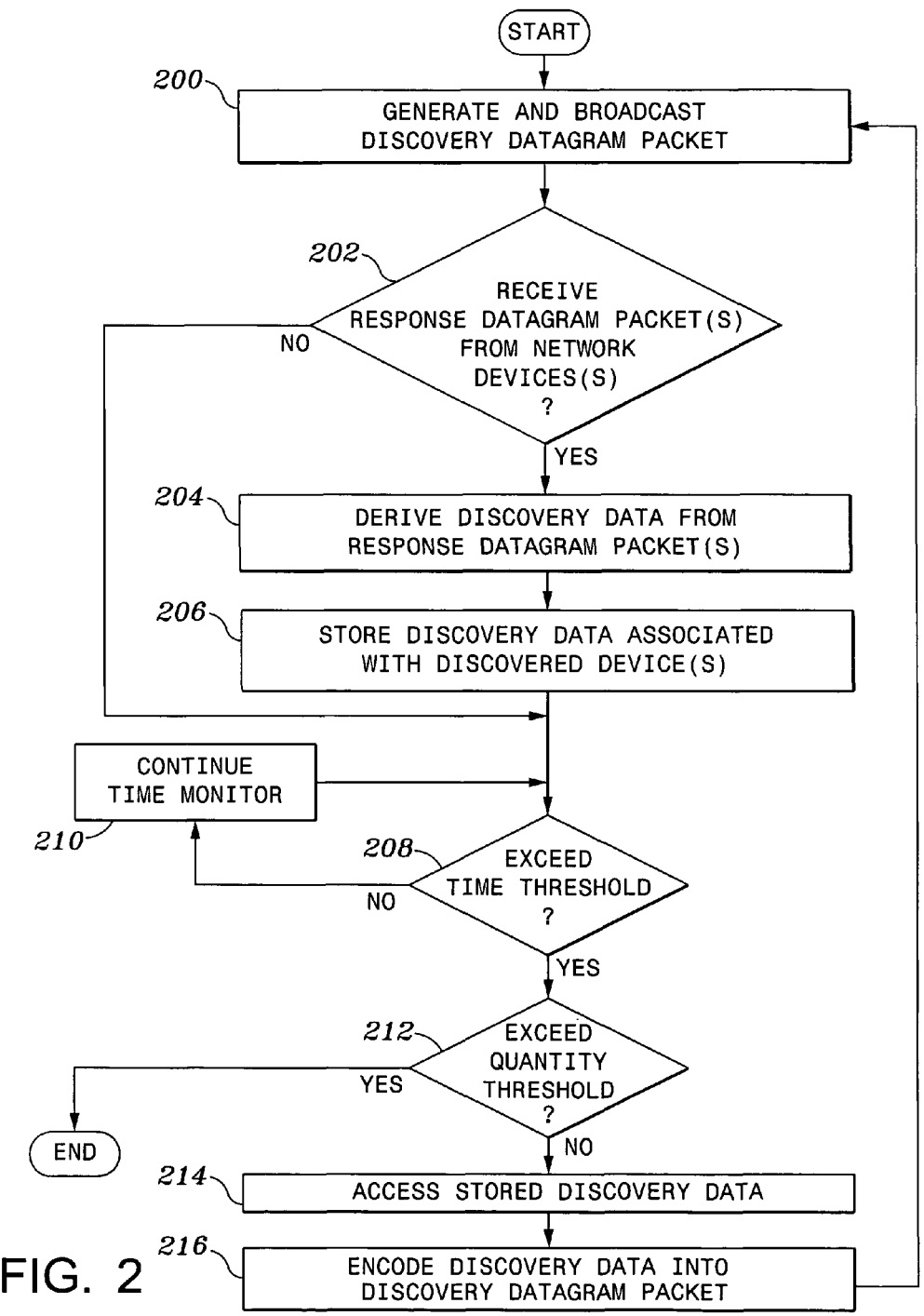
FIG. 2 is a flow diagram illustrating an embodiment of a network device discovery method.
Figure 3:
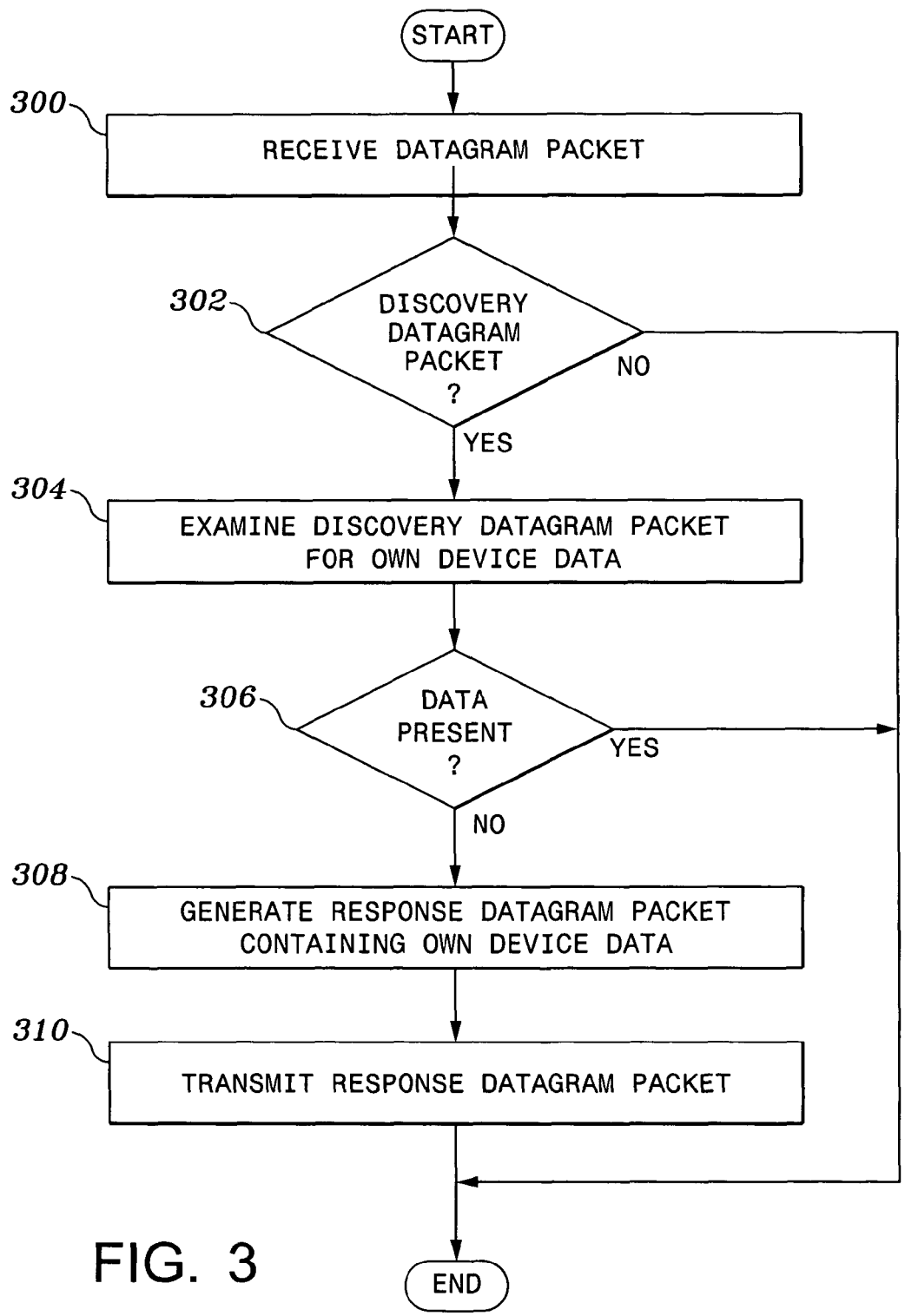
FIG. 3 is a flow diagram illustrating another embodiment of a network device discovery method.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a network device discovery system 10. In the embodiment illustrated in FIG. 1, system 10 comprises a computing system 12 communicatively coupled to a network 14, and one or more network-attached devices $16_1$-$16_N$ communicatively coupled to computing system 12 via network 14. Computing system 12 may comprise any type of computing platform such as, but not limited to, a desktop computer, laptop or portable computer, server, workstation, or other type of computing system communicatively couplable to network 14. Network 14 may comprise any type of wired or wireless communications network such as, but not limited, a local area network (LAN), wireless local area network (WLAN), virtual private network (VPN), wide area network (WAN), or wireless wide area network (WWAN). Devices 16 may comprise any type of network-attachable device such as, but not limited to, a network-attachable storage device, printer, display device, copier, facsimile device, all-in-one imaging device, router, or another computing system.

In the embodiment illustrated in FIG. 1, computing system 12 comprises a processor 20 and a memory 24. In FIG. 1, memory 24 comprises a shared library 22 such as, but not limited to, a shared dynamic link library (DLL). In the embodiment illustrated in FIG. 1, library 22 comprises a discovery module 30 which may comprise hardware, software, firmware, or a combination thereof. Discovery module 30 preferably comprises logic and/or a set of instructions executable by processor 20 for performing a discovery or enumeration process or procedure to detect and/or otherwise identify devices 16 communicatively coupled to computing system 12 via network 14. In the embodiment illustrated in FIG. 1, memory 24 also comprises an operating system 34. Discovery module 30 is preferably located and/or otherwise stored in library 22 to facilitate access thereto by operating system 34 or another application or device stored on and/or otherwise residing on computing system 12. However, it should be understood that discovery module 30 may be otherwise located and/or stored. In FIG. 1, library 22 comprises device discovery data 36 having information associated with device(s) 16 detected and/or otherwise identified on network 14.

In the embodiment illustrated in FIG. 1, device 16 comprises a processor 40 and a memory 42. In FIG. 1, a discovery module 44 is illustrated as being disposed in memory 42 so as to be accessible and executable by processor 40. Discovery module 44 may comprise software, hardware, firmware, or a combination thereof. Discovery module 44 preferably comprises logic or a set of instructions executable by processor 40. Discovery module 44 is used to facilitate device discovery and/or enumeration by computing system 12.

In operation, discovery module 30 is used to generate and broadcast a plurality of device discovery datagram packets 50 over network 14 to discover and/or otherwise identify device(s) 16 attached or communicatively coupled to network 14. For example, in some embodiments, discovery module 30 is configured to generate and broadcast discovery datagram packets 50 N times (where "N" represents a desired or predetermined quantity) at a predetermined rate and/or for a predetermined period of time (e.g., three times, each second for three seconds). However, it should be understood that the elapsed time between broadcasts, as well as the total quantity of broadcasts, may be varied. Discovery module 30 is preferably configured to encode discovery datagram packets 50 with identification information corresponding to discovered or identified device(s) 16. For example, an initial broadcast of a discovery datagram packet 50 may not contain any identification information related to device(s) 16 because no device(s) 16 have yet been discovered. However, if one or more device(s) 16 respond to the initial discovery datagram packet 50, subsequent broadcasts of discovery datagram packets 50 are encoded with identification information associated with the responding and/or discovered device(s) 16. Thus, for each subsequent broadcast of a discovery datagram packet 50, the discovery datagram packet 50 contains identification information associated with those device(s) 16 that have responded to a prior discovery datagram packet 50. Information associated with the discovered device(s) 16 is stored in library 22 as device discovery data 36. However, it should be understood that device discovery data 36 may be otherwise stored or located.

In response to receiving a datagram packet from computing system 12, the particular receiving device 16 determines whether the datagram packet is a discovery datagram packet 50. For example, in some embodiments, if a datagram packet is received by device 16 before first receiving a discovery datagram packet 50, the first received datagram packet is ignored and/or discarded (e.g., the receiving device 16 may be unable to process the datagram packet and/or may be configured to discard the datagram packet until a discovery datagram packet is received). If the received datagram packet is a discovery datagram packet 50, discovery module 44 of device 16 decodes the datagram packet 50 to determine whether the received discovery datagram packet 50 is encoded with information identifying the receiving device 16. For example, in some embodiments, discovery datagram packet 50 is encoded with information identifying each device 16 previously discovered by computing system 12 such as, but not limited to, a media access control (MAC) address, Internet protocol (IP) address, network name, or other information associated with a respective device 16. Accordingly, if a particular device 16 receives a discovery datagram packet 50 encoded with its own identification information (e.g., a MAC address of the receiving device 16), the receiving device 16 ignores and/or otherwise discards the discovery datagram packet 50 (e.g., because the receiving device 16 has already responded and been discovered by computing system 12).

If the particular device 16 receiving the discovery datagram packet 50 determines that its own identification information has not been encoded within the discovery datagram packet 50, discovery module 44 is used to generate a response datagram packet 60 for transmittal to computing system 12 via network 14 (e.g., either by direct transmittal to computing system 12 or by broadcasting response datagram packet 60 over network 14 so as to be receivable by computing system 12). Discovery module 44 is configured to encode response datagram packet 60 with its own identification information (e.g., a MAC address, IP address, network name and/or other type of information used to identify device 16 on network 14). Accordingly, provided response datagram packet 60 is received by computing system 12, any subsequent discovery datagram packet 50 received by the particular device 16 should be encoded with its own identification information such that the subsequently received discovery datagram packet 50 may be ignored or discarded by the particular device 16 (e.g., because the identification information encoded in the subsequent discovery datagram packet 50 indicates that the particular device 16 has already been discovered and/or detected on network 14).

In response to receiving response datagram packet 60 from device(s) 16, discovery module 30 decodes the response datagram packet 60 to discover identification information corresponding to each transmitting device 16. The identification information associated with each transmitting device 16 is illustrated in FIG. 1 as device discovery data 36. In FIG. 1, device discovery data 36 comprises device MAC address data 70 corresponding to each discovered or identified device 16 (e.g., device MAC address data $70_1$-$70_N$ corresponding to each discovered device 16). However, it should be understood that device discovery data 36 may comprise additional or alternative types of information.

In some embodiments, discovery module 30 is configured to automatically generate and transmit or broadcast discovery datagram packets 50 according to a predetermined rate or interval for a predetermined time period (e.g., one broadcast every second). Preferably, discovery module 30 accesses device discovery data 36 to identify and/or otherwise locate information associated with discovered or identified devices 16 on network 14 and encodes device discovery data 36 associated with the detected devices 16 in subsequently broadcast discovery datagram packets 50. For example, in some embodiments, a device MAC address 70 of each discovered device 16 is encoded in a subsequently broadcast discovery datagram packet 50. Further, it should be understood that in some embodiments, discovery module 30 is configured to periodically broadcast (e.g., at a predetermined or random interval) an unending stream or quantity of discovery datagram packets 50 (e.g., without a predetermine limit of quantity, thereby facilitating discovery of later-attached device(s) 16).

As an illustrative example, assume three devices 16 are coupled to network 14 as device $16_A$, device $16_B$ and device $16_C$. Discovery module 30 of computing system 12 broadcasts an initial discovery datagram packet 50, over network 14 that is received by devices $16_A$ and $16_B$ but is not received by device $16_C$. Because the packet 50, is an initial packet, discovery module 44 of the respective devices $16_A$ and $16_B$ decode the packet $50_1$ and determine that their respective identification information is not present within the packet $50_1$. Accordingly, devices $16_A$ and $16_B$ each encode and transmit a response datagram packet 60 containing their identification information (e.g., device $16_A$'s packet 60 is encoded with a MAC address of device $16_A$, and device $16_B$'s packet 60 is encoded with a MAC address of device $16_B$) to computing system 12. In this example, assume that computing system 12 receives the response datagram packet 60 from device $16_A$ but either does not receive a response datagram packet 60 from device $16_B$ or receives a response datagram packet 60 from device $16_B$ at the same time as a response datagram packet 60 from device $16_A$ (thereby inadvertently "dropping" the response datagram packet 60 received from device $16_B$). Thus, in operation, discovery module 30 decodes the response datagram packet 60 received from device $16_A$ and stores the identification information for device $16_A$ as device discovery data 70 (e.g., the MAC address of device $16_A$). Discovery module 30 generates and broadcasts another discovery datagram packet $50_2$ encoded with device $16_A$'s data 70 (e.g., device $16_A$'s MAC address). Assume that device $16_A$, device $16_B$ and device $16_C$ each receive the discovery datagram packet $50_2$. Device $16_A$ decodes the packet $50_2$ and determines that its identification information (e.g., device $16_A$'s MAC address) is encoded within the packet $50_2$, so device $16_A$ ignores or discards the packet $50_2$. Devices $16_B$ and $16_C$ each decode the packet $50_2$ and discover that their respective identification information is not encoded within the packet $50_2$. Accordingly, devices $16_B$ and $16_C$ each generate and transmit a response datagram packet 60 encoded with their respective identification information to computing system 12. The above procedure is continued according to a predetermined schedule and/or quantity of broadcasts to facilitate discovery of devices 16.

Thus, in operation, discovery module 30 broadcast a discovery datagram packet 50 and receives response datagram packets 60 from one or more devices 16. It should also be understood that, on occasion, no response datagram packet 60 may be received by computing system 12 (e.g., in response to non-receipt of packet 50 by devices 16, non-receipt of packet 60 by computing system 12, etc). Discovery module 30 broadcasts a subsequent discovery datagram packet 50 identifying the discovered devices 16 by encoding information associated with the discovered devices 16 in the subsequent discovery datagram packet 50. Accordingly, in response to receiving a subsequent discovery datagram packet 50, if a particular device 16 discovers that its own identification information is encoded within the discovery datagram packet 50, no further action is required by the receiving device 16. However, if the receiving device 16 discovers that its identification information has not been encoded in the discovery datagram packet 50, the particular device 16 encodes its identification data in a response datagram packet 60 and transmits the encoded response datagram packet 60 to computing system 12.

FIG. 2 is a flow diagram illustrating an embodiment of a network device discovery method. The method begins at block 200 where discovery module 30 generates and broadcasts a discovery datagram packet 50 over network 14. At decisional block 202, a determination is made whether discovery module 30 receives a response datagram packet 60 from one or more network devices 16. If no response datagram packets 60 are received, the method proceeds to decisional block 208. If a response datagram packet 60 is received, the method proceeds to block 204, where discovery module 30 derives device discovery data 36 from response datagram packet 60. At block 206, discovery module 30 stores the device discovery data 36 in memory 24.

At decisional block 208, a determination is made whether a time period from the broadcast of the discovery datagram packet 50 at block 200 has exceeded a predetermined threshold. If the elapsed time has not yet exceeded the predetermined threshold, the method proceeds to block 210, where discovery module 30 continues monitoring the time elapsed from the broadcast of discovery datagram packet 50 from block 200. If at decisional block 208 it is determined that the elapsed time from the broadcast of discovery datagram packet 50 at block 200 has exceeded a predetermined threshold, the method proceeds to decisional block 212, where a determination is made whether a quantity of broadcast discovery datagram packets 50 has exceeded a predetermined threshold or limit. For example, in some embodiments, discovery module 30 is configured to broadcast a predetermined quantity of discovery datagram packets 50. If the quantity of broadcast discovery datagram packets 50 has exceeded the predetermined threshold, the method ends. If the quantity of broadcast discovery datagram packets 50 has not exceeded the predetermined threshold, the method proceeds to block 214, where discovery module 30 accesses device discovery data 36 to locate identification information associated with the identified or discovered device(s) 16 on network 14. At block 216, discovery module 30 encodes device discovery data 36 into a subsequent discovery datagram 50. The method proceeds to block 200, where the encoded discovery datagram packet 50 is broadcast over network 14. It should be understood that the method depicted by blocks 200, 202, 204, 206, 208, 210, 212, 214 and/or 216 may be repeated to facilitate identification of device(s) 16 on network 14.

FIG. 3 is a flow diagram illustrating another embodiment of a network device discovery method. The method begins at block 300, where device 16 receives a discovery datagram packet 50. At decisional block 302, discovery module 44 analyzes the received packet to determine and/or otherwise verify that the received packet is a discovery datagram packet 50. If the received packet is not a discovery datagram packet 50, the received packet is ignored and/or otherwise discarded and the method ends. If at decisional block 302 it is determined that the received packet is a discovery datagram packet 50, the method proceeds to block 304, where discovery module 44 examines the discovery datagram 50 for its own device identification information. For example, discovery module 44 decodes the discovery datagram packet 50 and determines whether the discovery datagram packet 50 contains identification information associated with the receiving device 16 (e.g., its own MAC address, IP address, etc).

At decisional block 306, a determination is made whether the received discovery datagram packet 50 contains its own identification information. If the received discovery datagram packet 50 does contain its own identification information, the discovery datagram packet 50 is ignored and/or otherwise discarded and the method ends. If the received discovery datagram packet 50 does not contain its own identification information, the method proceeds to block 308, where discovery module 44 generates a response datagram packet 60 encoded and/or otherwise containing its own device identification information (e.g., its own MAC address, IP address, etc). At block 310, discovery module 44 transmits and/or otherwise communicates the response datagram packet 60 to computer system 12.

Thus, embodiments provide device discovery systems and methods that utilize a datagram-based network protocol with increased reliability. It should be understood that in the described methods, certain functions may be omitted, accomplished in a sequence different from that depicted in FIGS. 2 and 3, or simultaneously performed. Also, it should be understood that the methods depicted in FIGS. 2 and 3 may be altered to encompass any of the other features or aspects as described elsewhere in the specification. Further, embodiments may be implemented in software and can be adapted to run on different platforms and operating systems. In particular, functions implemented by discovery module 30 and discovery module 44, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semiconductor system, apparatus, device, or propagation medium.

What is claimed is:

1. A system, comprising:
a processor configured to broadcast a device discovery datagram packet to a network, the device discovery datagram packet encoded with data identifying at least one device discovered on the network,
wherein the processor is configured to broadcast device discovery datagram packets to the network at a predetermined rate as a quantity per unit of time for a predetermined period, and
wherein if a time period from the broadcast of the device discovery datagram packet exceeds a predetermined threshold and a quantity of the device discovery datagram packets broadcast to the network exceeds a predetermined threshold, the processor is configured to discontinue broadcast of the device discovery datagram packets to the network.

2. The system of claim 1, wherein the processor is configured to derive the data from a discovery response datagram packet received from the at least one discovered device.

3. The system of claim 1, wherein if the time period from the broadcast of the device discovery datagram packet does not exceed the predetermined threshold, the processor is configured to continue to wait for a discovery response datagram packet from a device on the network.

4. The system of claim 1, wherein if the quantity of device discovery datagram packets broadcast to the network does not exceed the predetermined threshold, the processor is configured to encode the data into a subsequent device discovery datagram packet and broadcast the subsequent device discovery datagram packet to the network.

5. The system of claim 1, wherein the data comprises a media access control address of the at least one discovered device.

6. The system of claim 1, wherein the processor is configured to retrieve the data from a memory.

7. A method, comprising:
- generating a device discovery datagram packet encoded with data identifying at least one device discovered on a network;
- broadcasting the device discovery datagram packet to the network;
- monitoring a time period from broadcasting the device discovery datagram packet to the network and monitoring a quantity of device discovery datagram packets broadcast to the network; and
- discontinuing broadcasting of the device discovery datagram packets to the network if the time period from broadcasting exceeds a predetermined threshold and the quantity of device discovery datagram packets exceeds a predetermined threshold,
- wherein the device discovery datagram packets are broadcast to the network at a predetermined rate as a quantity per unit of time for a predetermined period.

8. The method of claim 7, further comprising deriving the data from a discovery response datagram packet received from the at least one discovered device.

9. The method of claim 7, further comprising continuing to wait for a discovery response datagram packet from a device on the network if the time period does not exceed the predetermined threshold.

10. The method of claim 7, further comprising encoding the data into a subsequent device discovery datagram packet and broadcasting the subsequent device discovery datagram packet to the network if the quantity does not exceed the predetermined threshold.

11. The method of claim 7, further comprising encoding a media access control address of the at least one discovered device in the device discovery datagram packet.

12. The system of claim 1, wherein a device of the network is configured to discard a datagram packet from the processor until a device discovery datagram packet is received.

13. The method of claim 7, wherein a device of the network is configured to discard a datagram packet until a device discovery datagram packet is received.

* * * * *